United States Patent
Mir et al.

(10) Patent No.: US 6,549,871 B1
(45) Date of Patent: Apr. 15, 2003

(54) CURRENT ESTIMATION FOR AN ELECTRIC MACHINE

(75) Inventors: Sayeed A. Mir, Saginaw, MI (US); Aparna S Amberkar, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/848,643

(22) Filed: May 3, 2001

(51) Int. Cl.[7] .............................. G01P 3/00; G06F 15/00
(52) U.S. Cl. ....................................... 702/145; 702/151
(58) Field of Search .................... 73/862.041; 244/175; 318/489; 324/76.11, 160, 177, 503, 511, 522; 702/38, 41, 57, 64, 130, 142, 145, 150, 151

(56) References Cited

U.S. PATENT DOCUMENTS

| | | | | |
|---|---|---|---|---|
| 5,839,537 A | * | 11/1998 | Nishino et al. | 180/443 |
| 5,988,310 A | * | 11/1999 | Nishino et al. | 180/443 |
| 6,070,692 A | * | 6/2000 | Nishino et al. | 180/443 |
| 6,152,254 A | * | 11/2000 | Phillips | 180/422 |
| 6,272,410 B2 | * | 8/2001 | Okanoue et al. | 701/42 |
| 6,326,750 B1 | * | 12/2001 | Marcinkiewicz | 318/432 |
| 6,370,459 B1 | * | 4/2002 | Phillips | 701/41 |
| 6,373,211 B1 | * | 4/2002 | Henry et al. | 318/432 |
| 6,392,418 B1 | * | 5/2002 | Mir et al. | 324/503 |

OTHER PUBLICATIONS

Franceso Parasilti, Roberto Retrella, Marco Tursini, "Low Cost Phase Current Sensing in DSP Based AC Drives," University of L'Aquila, L'Aquila, Italy, pp. 1284–1289.

Frede Blaabjerg, John K. Pedersen, Ulrik Jaeger, and Paul Thoegersen, IEEE Transactions On Industry Applications, vol. 33, No. 5, Sep./Oct. 1997, "Single Current Sensor Technique in the DC Link of Three–Phase PWM–VS Inverters: A Review and a Novel Solution," pgs. 1241–1249.

Chen, Z; Tomita, M; Doki, S; Okuma, S;"New Adaptive Sliding Observer For Sensorless Control Of Surface Permanent Magnet Synchronous Motor"; 3rd Int'nl Power Electronics and Motion Control Conference Proceedings; vol. 1; 2000; pp 180–185.*

Ertugrul, N; Acarnley, P;"Indirect Rotor Position Sensing In Real Time For Brushless Permanent Magnet Motor Drives";IEEE Transactions on Power Electronics; vol. 13, Issue 4; Jul. 1998; pp 608–616.*

* cited by examiner

*Primary Examiner*—John Barlow
*Assistant Examiner*—Douglas N Washburn
(74) *Attorney, Agent, or Firm*—Edmund P. Anderson

(57) ABSTRACT

A method and system for estimating current in a PM electric machine is disclosed. The method includes acquiring a torque value representative of the torque produced by the electric machine; receiving a position value indicative of the rotational position of the electric machine; obtaining a speed value indicative of the rotational velocity of the electric machine; receiving a temperature value representative of a temperature of the electric machine; calculating an estimate of the current. Where the calculating is based upon at least one of the torque value, the position value, the speed value, and the temperature value.

39 Claims, 3 Drawing Sheets

CURRENT ESTIMATION FOR AN ELECTRIC MACHINE

BACKGROUND

Most modern vehicles have power steering in which the force exerted by the operator on the steering wheel is assisted by hydraulic pressure from an electric or engine-driven pump. The force applied to the steering wheel is multiplied by the mechanical advantage of a steering gear. In many vehicles, the steering gear is a rack and pinion, while in others it is a recirculating ball type.

When operating at low speeds, hydraulic assist provides satisfactory feel and response characteristics and accommodates the excess capacity required for high-speed operation by the constant circulation of hydraulic fluid through a directional bypass valve. This bypass flow combined with system backpressure expends power needlessly from the vehicle powerplant. These losses are also a function of the rotational speed of the pump. Thus, hydraulic efficiency decreases with engine speed. Average losses under a no steering, zero speed condition can exceed 100 Watts.

Electric power steering is commonly used in the hybrid vehicles to improve fuel economy and has started to replace hydraulic power steering in some vehicles. One way this is accomplished is through the reduction or elimination of losses inherent in traditional steering systems. Therefore, electric power steering typically requires power only on demand. Commonly, in such systems an electronic controller is configured to require significantly less power under a small or no steering input condition. This dramatic decrease from conventional steering assist is the basis of the power and fuel savings. Electric power steering has several additional advantages. The steering feel provided to the operator has greater flexibility and adaptability. Overall system mass savings may also be achieved. Electric power steering is powerplant independent, which means it can operate during an all electric mode on a vehicle.

Furthermore, polyphase permanent magnet (PM) brushless motors excited with a sinusoidal field provide lower torque ripple, noise, and vibration when compared with those excited with a trapezoidal field. Theoretically, if a motor controller produces polyphase sinusoidal currents with the same frequency and phase as that of the sinusoidal back electromotive force (EMF), the torque output of the motor will be a constant, and zero torque ripple will be achieved. However, due to practical limitations of motor design and controller implementation, there are always deviations from pure sinusoidal back EMF and current waveforms. Such deviations usually result in parasitic torque ripple components at various frequencies and magnitudes. Various methods of torque control can influence the magnitude and characteristics of this torque ripple.

One method of torque control for a permanent magnet motor with a sinusoidal, or trapezoidal back EMF is accomplished by controlling the motor phase currents so that the current vector is phase aligned with the back EMF. This control method is known as current mode control. In this a method, the motor torque is proportional to the magnitude of the current. However, current mode control requires a more complex controller for digital implementation and processing. The controller would also require multiple current sensors and A/D channels to digitize the feedback from current sensors, which would be placed on the motor phases for phase current measurements.

Another method of torque control is termed voltage mode control. In voltage mode control, the motor phase voltages are controlled in such a manner as to maintain the motor flux sinusoidal and motor backemf rather than current feedback is employed. Voltage mode control also typically provides for increased precision in control of the motor, while minimizing torque ripple. One application for an electric machine using voltage mode control is the electric power steering system (EPS) because of its fuel economy and ease-of-control advantages compared with the traditional hydraulic power steering. However, commercialization of EPS systems has been limited due to cost and performance challenges. Among the most challenging technical issues are a pulsation at the steering wheel and the audible noise associated with voltage mode control.

To satisfy the needs of certain applications for precise and accurate control, current mode control employing motor phase current feedback may be utilized, in lieu of the voltage mode control method wherein no current feedback occurs. That is, current mode control is a closed loop methodology in that a current feedback in addition to the motor position and speed feedback is used as controlling parameter by the current mode control, while voltage mode control is an open loop control methodology wherein only position and speed feedback is used. Voltage mode control systems may be more desirable in certain applications because the need for external sensors to provide feedback is minimized. However, it is nonetheless desirable to monitor and observe the characteristics of the motor to ensure proper function throughout the entire operational regime especially under dynamic operating conditions or to address changes in the motor parameters. For example, under temperature variations, the motor parameters and characteristics vary, often significantly.

EPS control systems employing voltage mode control algorithms, generally do not use the motor phase current for torque control. However, the current may still be used in a variety of algorithms such as motor parameter tuning, operation monitoring and diagnostics. Furthermore, in control algorithms with phase advancing, the phase current vector becomes a complex function of motor torque, speed, phase angle, and motor parameters. While the phase current is readily available for measurement, such measurement would require additional sensors and interfaces. Therefore, in a voltage control system, it is desirable to determine the motor phase current without relying upon current sensors or measurements.

BRIEF SUMMARY

A method and system for estimating current in a PM electric machine is disclosed. The method includes acquiring a torque value representative of the torque produced by the electric machine; receiving a position value indicative of the rotational position of the electric machine; obtaining a speed value indicative of the rotational velocity of the electric machine; receiving a temperature value representative of a temperature of the electric machine; calculating an estimate of the current. Where the calculating is based upon at least one of said torque value, said position value, said speed value, and said temperature value.

The system for estimating current in an electric machine comprises:

a PM electric machine; a position sensor configured to measure a rotor position of the electric machine and transmit a rotor position signal; a temperature sensor configured to measure a temperature of the electric machine transmit a temperature signal; a controller, which controller receives the rotor position signal and calculate a motor speed value; receives a temperature signal and generate a temperature value; calculates the estimate of the current.

BRIEF DESCRIPTION OF THE DRAWINGS

The present invention will now be described, by way of an example, with references to the accompanying drawings, wherein like elements are numbered alike in the several figures in which.

DETAILED DESCRIPTION OF THE PREFERRED EMBODIMENT

Figure 2:
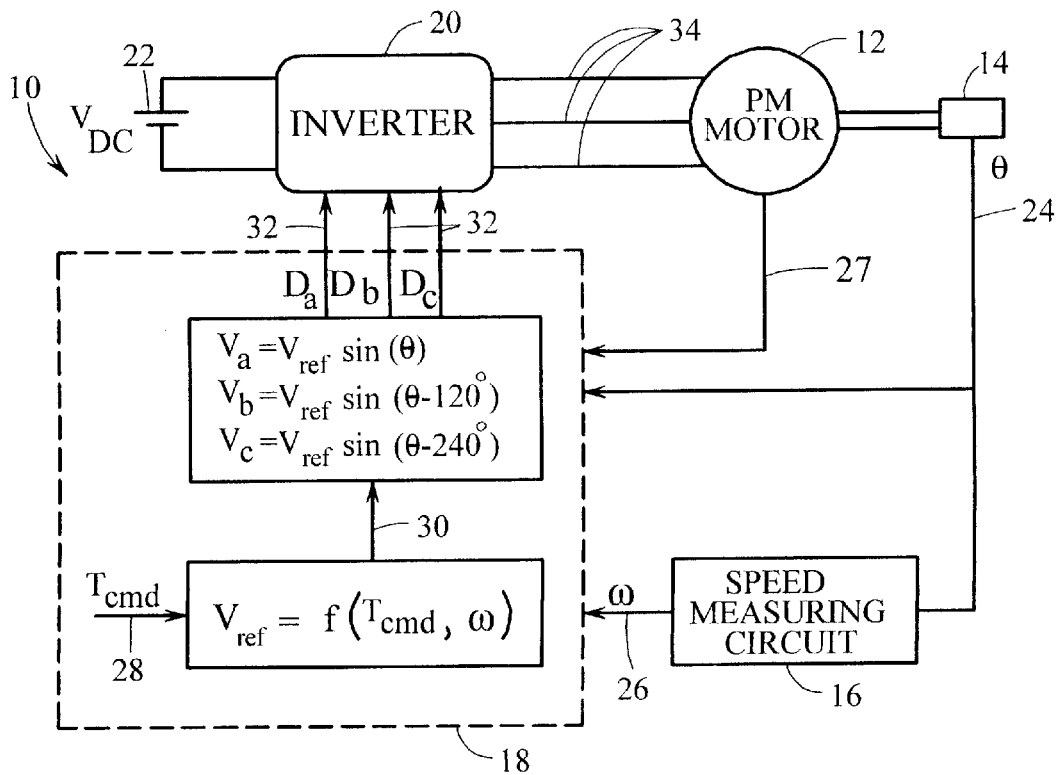
FIG. 2 is a drawing depicting a voltage mode controlled PM motor drive system.

Referring now to the drawings in detail, FIG. 2 depicts a PM motor system 10 where numeral 10 generally indicates a system for controlling the torque of a sinusoidally excited PM electric machine 12 (e.g. a motor, hereinafter referred to as a motor). The system includes, but is not limited to, a motor rotor position encoder 14, a speed measuring circuit 16, a controller 18, power circuit or inverter 20 and power source 22. Controller 18 is configured to develop the necessary voltage(s) out of inverter 20 such that, when applied to the motor 12, the desired torque is generated. Because these voltages are related to the position and speed of the motor 12, the position and speed of the rotor are determined. A rotor position encoder 14 is connected to the motor 12 to detect the angular position of the rotor denoted θ. The encoder 14 may sense the rotary position based on optical detection, magnetic field variations, or other methodologies. Typical position sensors include potentiometers, resolvers, synchros, encoders, and the like, as well as combinations comprising at least one of the forgoing. The position encoder 14 outputs a position signal 24 indicating the angular position of the rotor.

The motor speed denoted $\omega_m$ may be measured, calculated or a combination thereof. Typically, the motor speed $\omega_m$ is calculated as the change of the motor position θ as measured by a rotor position encoder 14 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Another method of determining speed depending upon the type of encoder employed for the motor position θ, may be to count the position signal pulses for a predetermined duration. The count value is proportional to the speed of the motor. In the figure, a speed measuring circuit 16 determines the speed of the rotor and outputs a speed signal 26.

The temperature of the motor 12 is measured utilizing one or more temperature sensors located at the motor windings (not shown) The temperature sensor transmits a temperature signal 27 to the controller 18 to facilitate the processing prescribed herein. Typical temperature sensors include thermocouples, thermistors, thermostats, and the like, as well as combinations comprising at least one of the foregoing sensors, which when appropriately placed provide a calibratable signal proportional to the particular temperature.

The position signal 24, speed signal 26, temperature signal 27, and a torque command signal 28 are applied to the controller 18. The torque command signal 28 is representative of the desired motor torque value. The controller 18 processes all input signals to generate values corresponding to each of the signals resulting in a rotor position value, a motor speed value, a temperature value and a torque command value being available for the processing in the algorithms as prescribed herein. Measurement signals, such as the abovementioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

The controller 18 determines the voltage amplitude $V_{ref}$ 30 required to develop the desired torque by using the position signal 24, speed signal 26, and torque command signal 28, and other fixed motor parameter values. For a three-phase motor, three sinusoidal reference signals that are synchronized with the motor back EMF $\vec{E}$ are required to generate the required motor input voltages. The controller 18 transforms the voltage amplitude signal $V_{ref}$ 30 into three phases by determining phase voltage command signals $V_a$, $V_b$, and $V_c$ from the voltage amplitude signal 30 and the position signal 24 according to the following equations:

$$V_a = V_{ref}\sin(\theta)$$

$$V_b = V_{ref}\sin(\theta-120°)$$

$$V_c = V_{ref}\sin(\theta-240°)$$

In a motor drive system employing phase advancing, the phase advancing angle δ (FIG. 1) may also be calculated as a function of the input signal for torque or speed. The phase voltage signals $V_a$, $V_b$, $V_c$ are then phase shifted by this phase advancing angle δ. Phase voltage command signals $V_a$, $V_b$ and $V_c$ are used to generate the motor duty cycle signals $D_a$, $D_b$, and $D_c$ 32 using an appropriate pulse width modulation (PWM) technique. Motor duty cycle signals 32 of the controller 18 are applied to a power circuit or inverter 20, which is coupled with a power source 22 to apply phase voltages 34 to the stator windings of the motor in response to the motor voltage command signals.

In order to perform the prescribed functions and desired processing, as well as the computations therefore (e.g., the execution of voltage mode control algorithm(s), the current estimation prescribed herein, and the like), controller 18 may include, but not be limited to, a processor(s), computer (s), memory, storage, register(s), timing, interrupt(s), communication interfaces, and input/output signal interfaces, as well as combinations comprising at least one of the foregoing. For example, controller 18 may include signal input signal filtering to enable accurate sampling and conversion or acquisitions of such signals from communications interfaces. Additional features of controller 18 and certain processes therein are thoroughly discussed at a later point herein.

In an exemplary embodiment, controller 18 estimates the motor current by evaluating other system parameters and processing. Controller 18 receives the abovementioned input signals to facilitate the processes and as a result generates one or more output signals including an estimate of the phase current vector.

In order to facilitate comprehensive monitoring and diagnostic of the control algorithm the motor phase current vector is estimated as a function the known or utilized input signals rather than an intermediate control signal. In the exemplary embodiment the phase current vector is estimated as a function of torque command 28, motor temperature, motor speed and motor parameters. In addition, the motor parameters are compensated for any variations due to temperature.

To obtain and understanding of the processing preformed by controller 18 an understanding of the mathematical foundation of a voltage mode controlled PM motor is beneficial. Therefore, a development of the equations is provided herein.

Figure 1:
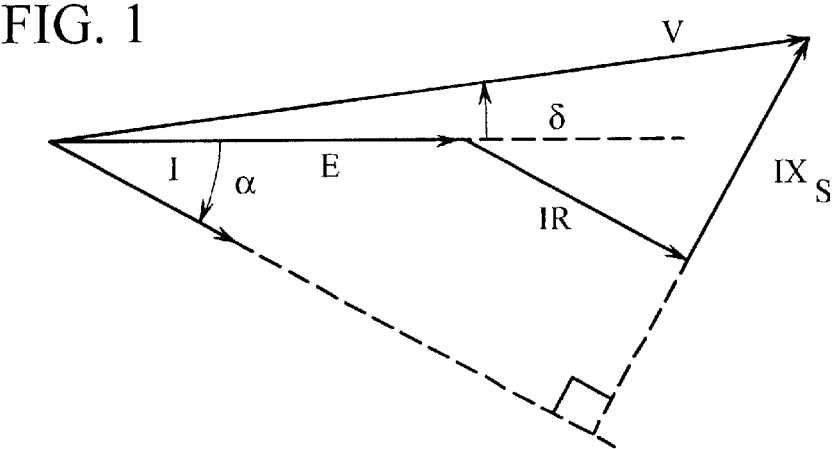
FIG. 1 depicts a phasor diagram for a PM motor.

The voltage mode control method is based on electric machine operation phasor diagram as shown in FIG. 1. Under steady state operating condition, the voltage phasor $\vec{V}$, back EMF phasor $\vec{E}$ and current phasor $\vec{I}$ of a sinusoidally excited PM motor are governed by:

$$\vec{V} = \vec{E} + \vec{I}R + j\vec{I}X_s \qquad (1)$$

where R is the winding resistance, $X_s$ is the phase reactance which is equal to the product of motor inductance $L_s$ and the excitation frequency $\omega_e$. Here, it is denoted that the angle between back EMF phasor $\vec{E}$ and current phasor $\vec{I}$ is α and the angle between the voltage phasor $\vec{V}$ and the back EMF phasor $\vec{E}$ is δ.

The equation for calculation of actual motor current vector $\vec{I}$ (which is the peak of sine current wave) is derived from the motor torque and voltage equations in the following manner.

The torque T of a PM machine under steady state is given by $$T = K_e I \cos \alpha \qquad (2)$$

where again $\vec{I}$ is the phase current, α is the angle between back EMF and current and $K_e$ is the motor torque constant.

Now from the diagram, the voltage equations of the motor can be written as:

$$V \cos \delta = E + IR \cos \alpha + IX_s \sin \alpha \qquad (3)$$

$$V \sin \delta = -IR \sin \alpha + IX_s \cos \alpha \qquad (4)$$

Solving equations (3) and (4) yields $$I \cos \alpha = \frac{(V \cos \delta - E)R + X_s V \sin \delta}{(R^2 + X_s^2)} \qquad (5)$$

Therefore, the torque T from (2) can be written as $$T = K_e \frac{(V \cos \alpha - E)R + X_s V \sin \alpha}{Z^2} \qquad (6)$$

where $$Z = \sqrt{R^2 + (\omega_e L)^2}$$

Substituting for $E = K_e \cdot \omega_m$ torque equation can be rewritten as $$T = \frac{K_e}{Z^2}[VR\cos\delta - K_e\omega_m R + \omega_e LV \sin\delta] \qquad (7)$$

where $\omega_e$ is the electric speed in radians, $\omega_m$ is the mechanical speed in radians.

Now by squaring equations (3) and (4) and then adding yields the result:

$$V^2 = E^2 + I^2(R^2 + X_s^2) + 2EI(R\cos\alpha + X_s \sin\alpha) \qquad (8)$$

Once again from equation (3):

$$I(R\cos\alpha + X_s \sin\alpha) = V\cos\delta - E$$

Substituting this into equation (8) leaves $$V^2 = E^2 + I^2 Z^2 + 2E(V\cos\delta - E) \text{ or} \qquad (9)$$

$$\Rightarrow V^2 - 2E\cos\delta V + (E^2 - I^2 Z^2) = 0$$

It is noteworthy to recognize that equation (9) is a quadratic equation where the solution is given by $$V = E\cos\delta + \sqrt{I^2 Z^2 - E^2 \sin^2 \delta}$$

Substituting for $E = Ke\omega_m$ we have $$V = K_e\omega_m \cos\delta + \sqrt{I^2 Z^2 - (K_e\omega_m)^2 \sin^2\delta} \qquad (10)$$

On substituting equation (10) into equation (7) and solving for motor current $\vec{I}$, it can be shown that the current $\vec{I}$ of the motor is given by the following equation.

$$I = K_e \sqrt{\left[\frac{T}{K_e^2} + \frac{\frac{\omega_m}{R}\sin\delta}{1+\left(\frac{P\omega_m L}{2R}\right)^2}\left(\frac{P\omega_m L}{2R}\cos\delta - \sin\delta\right)\right]^2 1 + \frac{\left(\frac{P\omega_m L}{2R}\right)^2}{\left(\cos\delta + \frac{P\omega_m L}{2R}\sin\delta\right)^2} + \frac{\left(\frac{\omega_m}{R}\right)^2 \sin^2\delta}{1+\left(\frac{P\omega_m L}{2R}\right)^2}} \qquad (11)$$

where P is the number of poles in the motor.

It is noteworthy to recognize that it may seem that equation (11) could be directly solved since all the parameters on right hand side of the equation are known and/or available. However, it is important to also realize the complexity of the equation and the computation time required to solve it. Further, it will be evident that the motor current $\vec{I}$ is a function of the motor parameters (R, $K_e$ and L) and phase advance angle δ in addition to the motor torque T, and speed $\omega_m$. It is also of note to appreciate that the motor parameters vary with temperature, and therefore are not treated as constants in determining a solution to the equation.

Thus, to avoid the intensive computations required to solve equation (11) directly, a look up table may be utilized in which motor current $\vec{I}$ can be estimated as a function of the variables on the right hand side of equation (11). There are six variables on the right hand side of equation (11), suggesting that a six dimensional look up table be utilized to address the six variables. A six dimensional look up table is, from a practicality perspective, not feasible and the interpolation with such a table is computationally intensive. Artfully, equation (11) may be rewritten with respect to the temperature dependent terms in the following form to decrease the dimension of lookup table.

$$I = K_{e(est)} \frac{K_{e(act)}}{K_{e(est)}} \sqrt{\left[\left[\frac{T\left(\frac{K_{e(est)}}{K_{e(act)}}\right)^2}{K_{e(est)}^2} + \frac{\frac{\omega_m \frac{R_{est}}{R_{act}} \sin\delta}{R_{est}}}{1+\left(\frac{P\omega_m \frac{R_{est}}{R_{act}}L}{2R_{est}}\right)^2}\left(\frac{P\omega_m \frac{R_{est}}{R_{act}}L}{2R_{est}}\cos\delta - \sin\delta\right)\right]^2 \frac{1+\left(\frac{P\omega_m \frac{R_{est}}{R_{act}}L}{2R_{est}}\right)^2}{\left(\cos\delta + \frac{P\omega_m \frac{R_{est}}{R_{act}}L}{2R_{est}}\sin\delta\right)^2} + \frac{\left(\omega_m \frac{R_{est}}{R_{act}}\right)^2 \sin^2\delta}{1+\left(\frac{P\omega_m \frac{R_{est}}{R_{act}}L}{2R_{est}}\right)^2}\right]}$$ (12)

Now if:

$$T_{mod} = T[K_{e(est)}/K_{e(act)}]^2 \text{ and } \omega_{mod} = \omega_m R_{(est)}/R_{(act)}$$

where $K_{e(est)}$ and $R_{(est)}$ are the motor back EMF constant and resistance at nominal temperature defined and measured for the motor off line, and $K_{e(act)}$ and $R_{(act)}$ are the motor back EMF constant and resistance while operating at temperature. It is noteworthy to recognize that at nominal temperature, $T_{mod}=T$ and $\omega_{mod}=\omega$. Thus, substituting the above values into the current equation (12) yields $$I = \frac{K_{e(act)}}{K_{e(est)}}\left[K_{e(est)}\sqrt{\left[\frac{T_{mod}}{K_{e(est)}^2} + \frac{\frac{\omega_{mod}}{R_{est}}\sin\delta}{1+\left(\frac{P\omega_{mod}L}{2R_{est}}\right)^2}\left(\frac{P\omega_{mod}L}{2R_{est}}\cos\delta - \sin\delta\right)\right]^2 \frac{1+\left(\frac{P\omega_{mod}L}{2R_{est}}\right)^2}{\left(\cos\delta + \frac{P\omega_{mod}L}{2R_{est}}\sin\delta\right)^2} + \frac{\left(\frac{\omega_{mod}}{R_{est}}\right)^2\sin^2\delta}{1+\left(\frac{P\omega_{mod}L}{2R_{est}}\right)^2}}\right]$$

or $$I = \frac{K_{e(act)}}{K_{e(est)}} I_{com}$$ (13)

where $$I_{com} = K_{e(est)}\sqrt{\left[\frac{T_{mod}}{K_{e(est)}^2} + \frac{\frac{\omega_{mod}}{R_{est}}\sin\delta}{1+\left(\frac{P\omega_{mod}L}{2R_{est}}\right)^2}\left(\frac{P\omega_{mod}L}{2R_{est}}\cos\delta - \sin\delta\right)\right]^2 \frac{1+\left(\frac{P\omega_{mod}L}{2R_{est}}\right)^2}{\left(\cos\delta + \frac{P\omega_{mod}L}{2R_{est}}\sin\delta\right)^2} + \frac{\left(\frac{\omega_{mod}}{R_{est}}\right)^2\sin^2\delta}{1+\left(\frac{P\omega_{mod}L}{2R_{est}}\right)^2}}$$ (14)

Equation (14) identifies the motor current vector $I_{com}$ in an uncompensated form, namely, prior to compensation by the temperature compensation ratio of the motor back EMF constants $K_{e(est)}/K_{e(act)}$. In an embodiment, equation (14) is implemented in the disclosed look up table form where the values of the motor parameters used are all nominal and therefore constants. Thus, in this configuration, $I_{com}$ in equation (14) is only a function of the modified torque; $T_{mod}$, and the modified motor speed; $\omega_{mod}$. Since the phase advance angle $\delta$, is a function of the motor speed $\omega_m$, there does not have to be an input to the table to accommodate it. The range of $T_{mod}=T$ and $\omega_{mod}=\omega_m$ is chosen by considering the range of operating temperature range and the values of $K_{e(act)}$ and $R_{(act)}$ at that range.

Figure 3:
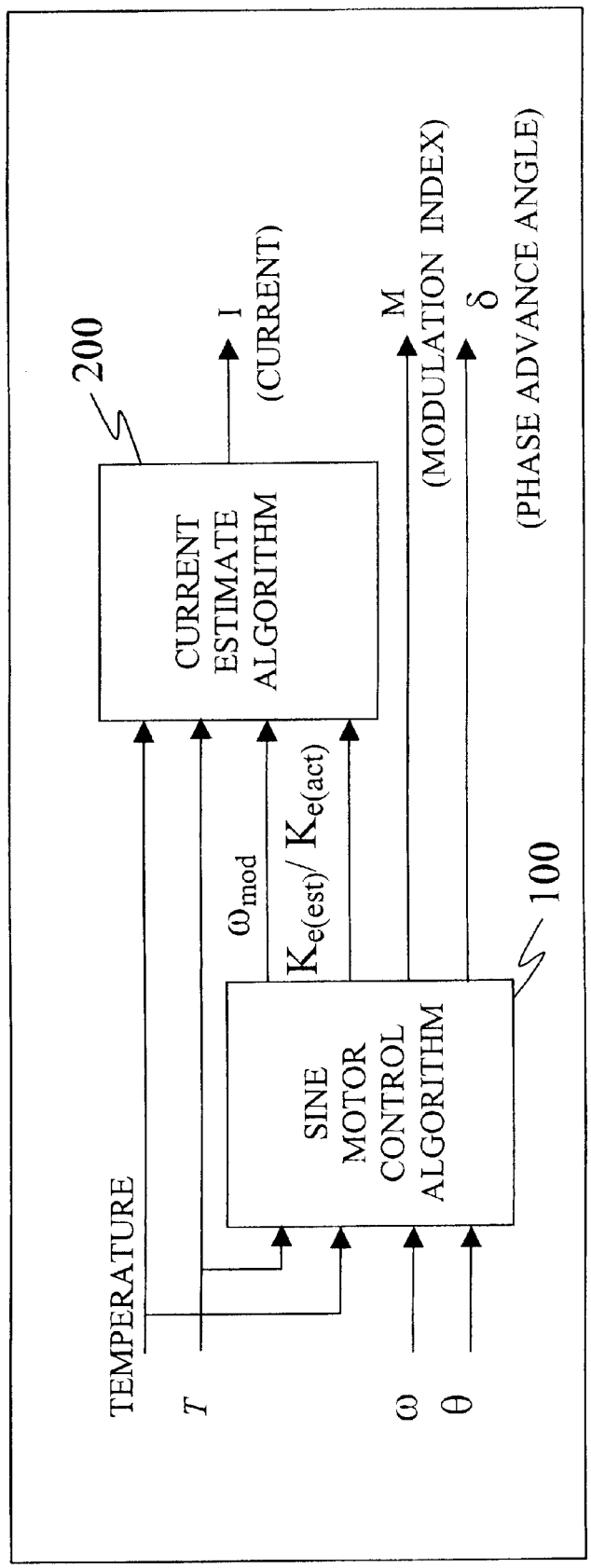
FIG. 3 is a simplified block diagram depicting a motor control algorithm with current estimation.

Returning now to FIG. 1, and referring to FIG. 3 as well, an embodiment implementing the abovementioned relationships is disclosed. FIG. 3 depicts a simplified block diagram of overall sine control system with the sine motor control algorithm 100 and the current estimate algorithm 200 implemented by controller 18. The sine motor control algorithm 100 utilizes the torque command T, the motor speed $\omega_m$, the motor position $\theta$, and the temperature to generate the commands for controlling the motor. The torque command; T, may be ascertained as a result of an external requirement for torque or as part of other algorithms (not shown).

Figure 4:
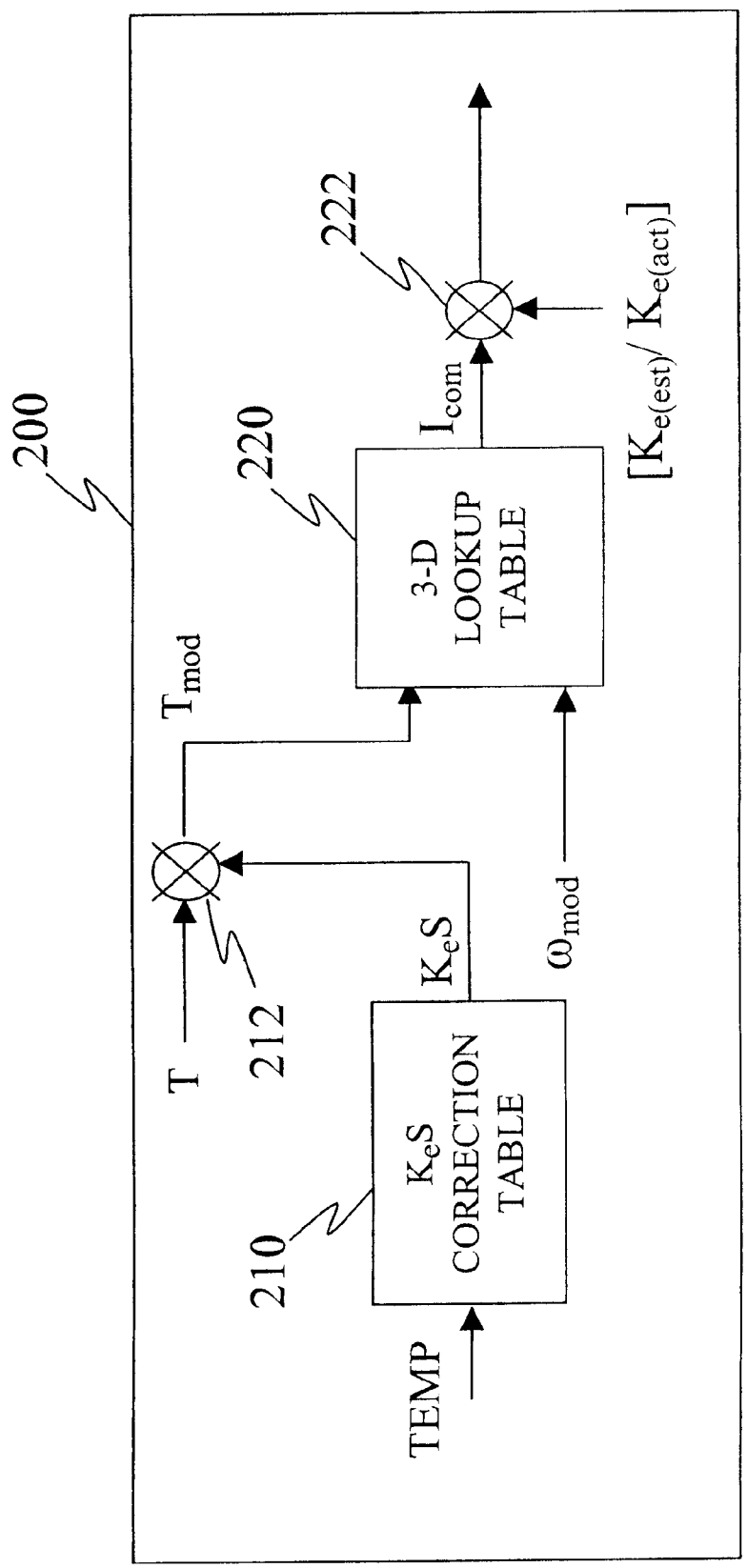
FIG. 4 is a simplified block diagram depicting a current estimation algorithm.

Continuing with FIG. 3, the torque command T, is also supplied to the current estimate algorithm 200. In addition, the $K_{e(est)}/K_{e(act)}$ variable and modified $\omega$ variable, $\omega_{mod}$, are calculated in the sine motor control algorithm 100 and then made available to the current estimate algorithm 200. FIG. 4 is a simplified block diagram depicting the function of the current estimate algorithm 200, which exemplifies an implementation of the mathematical relationships in equation (13). In the current estimate algorithm 200, the modified torque, $T_{mod}$, is calculated as the multiplication of the commanded torque, T, and a temperature correction term $K_eS=[K_{e(est)}/K_{e(act)}]^2$ at multiplier 212. $K_eS$ is a term denoting the value $[K_{e(est)}/K_{e(act)}]^2$ and is determined via a look table 210 indexed as a function of temperature. The resulting temperature scheduled torque $T_{mod}$, then providing the desired temperature compensation for the estimated motor current. The modified speed $\omega_{mod}$ is generated in the sine algorithm by compensating the measured motor speed $\omega_m$ for motor resistance variation due to changes in motor temperature using a lookup table. The process is similar to the temperature compensation of command torque as discussed above.

The value of $I_{com}$ corresponding to the nearest $T_{mod}$ and $\omega_{mod}$ is thereafter determined utilizing a multidimensional look-up table 220 and interpolation. A multidimensional look-up table requires multiple indexing inputs to generate a single output. In an embodiment, a 3D-lookup table 220 is employed to satisfy the computational requirements of equation (14). The 3D-lookup table 220 is indexed by both the modified torque command, $T_{mod}$ and modified motor speed, $\omega_{mod}$ to yield discrete $I_{com}$ values corresponding to equation (14). The data entries contained in the 3D lookup table 220 may thereafter be interpolated to yield the motor current for the operating points between the entries defined in the 3D lookup table 220. In an embodiment, a linear interpolation is utilized, however, a variety of interpolation methods are feasible. For example, a non-linear, higher order, curve, or least squares fit to the data in the table would be appropriate.

The number of elements utilized in the table is selected based upon the non-linearity of the current with respect to the torque and speed. As the non-linearity of the current with respect to the torque and speed increases, this dictates additional elements are required in the table to ensure an accurate estimate of the current. In an embodiment, a 42-element 3D-look-up table is used, where the modified command torque; $T_{mod}$, axis has six elements, and modified speed; $\omega_{mod}$, axis has seven elements.

It will be appreciated that while the disclosed embodiments refer in several instances, to a configuration utilizing look-up tables in implementation, such a reference is illustrative only and not limiting. Various alternatives will be apparent to those skilled in the art. For example, the processes and algorithms described above could employ, in addition to, or in lieu of, look-up tables, direct algorithms, gain or parameter scheduling, linearized interpolation or extrapolation, and/or various other methodologies, which may facilitate execution of the desired functions and the like, as well as combinations thereof. It should further be noted that the particular configurations of the lookup table(s) are once again, illustrative only, a variety of other configurations or element allocations are feasible. For example, while a 42-element table has been selected in an embodiment, a table with a greater number of elements for either of the independent inputs may yield a more accurate determination of the current at the expense of table complexity and computation time. Likewise, a table employing a lesser number of elements may prove simpler and save computation time, but may also reduce the accuracy of the estimation.

Finally, the resultant of the 3D look-up table; $I_{com}$, is scaled at current multiplier 222 by the value of $K_{e(est)}/K_{e(act)}$ to acquire the estimated value of motor current for the identified conditions. It will also be appreciated that the gains or scaling may take the form of multipliers, schedulers or lookup tables and the like, as well as combinations thereof, which are configured to be dynamic and may also be functions of other parameters.

Table 1 depicts an exemplary spreadsheet, which may be utilized to calculate the values in the 3D-look-up table. The spreadsheet is configured to find the value of the current in software counts. The inputs to the spreadsheet are the motor nominal parameters (e.g., at nominal temperature), speed, and a torque range and resolution of these variables used in the software of the disclosed embodiment. The spreadsheet includes formulas to then calculate the motor current based upon the defined parameters.

TABLE 1

Spreadsheet for 3D Look-up Table.
Spread sheet to find Motor current the calibration for the 3D current table Enter the Input data in the SPEED row and TORQUE Column then read the output from the CURRENT columns.

| | | Value | | counts | | | 16 volts | 1.90986 |
|---|---|---|---|---|---|---|---|---|
| Number of Poles | NP | 6 | | | | | | |
| Resistance | RLL | 4.80E-02 | Ohms | 815 | Resolution | | 5.89E-05 | ohms/count |
| Inductance | LLL | 1.51E-04 | Henery | 3870 | Resolution | | 3.91E-08 | Heneries/count |
| Torque Constant | KELL | 5.25E-02 | Nm/Amp | 2714 | Resolution | | 1.94E-05 | (Nm/amp)/count |
| Torque Max | Tmax | 3.41E+00 | NM | 255 | Resolution | | 0.01336 | NM/count |
| Speed Max | ω$_{max}$ | 8.19E+02 | rad/s | 4095 | Resolution | | 0.2 | rad/s/count |

Motor Speed rpm

| used by phase | | 0 | 0.85554 | 1.71008 | 2.56512 | 3.42016 | 4.2752 | | Motor Torque |
|---|---|---|---|---|---|---|---|---|---|
| advance macro | W | delta1 | delta2 | delta3 | delta4 | delta5 | delta6 | | Tcmd/K^2 |
| 0 | 0 | 0 | 0 | 0 | 0 | 0 | 0 | | 93.884 |
| 977.8479704 | 0.9672 | 0.0030134 | 0.12213 | 0.2145 | 0.2856 | 0.34159 | 0.3865 | | 93.884 |
| 1955.695941 | 1.93441 | 0.0902373 | 0.13032 | 0.2407 | 0.3333 | 0.41085 | 0.5205 | | 94.376 |
| 2933.543911 | 2.90161 | 1.157621 | 0.167252 | 0.3479 | 0.5806 | 0.85877 | 1.239 | | 151.88 |
| 3911.391881 | 3.86881 | 34.62928 | 0.307709 | 0.561 | 0.9209 | 1.31789 | 1.3179 | | 156.49 |
| 4889.239852 | 4.83602 | 54.89594 | 0.416748 | 0.7625 | 1.3669 | 1.36689 | 1.3669 | | 158.8 |
| 5867.087822 | 5.80322 | 68.37939 | 0.511052 | 0.9918 | 1.4001 | 1.40014 | 1.4001 | | 160.11 |

Ke^2 scaling cal  7365796
Ke scaling cal    inv(2714)

PHASE ADVANCE ANGLE/COMMAND TORQUE

| | | 0 | 0.85554 | 1.71008 | 2.56512 | 3.42016 | 4.2752 | | |
|---|---|---|---|---|---|---|---|---|---|
| | | 0 | 310.031 | 620.062 | 930.09 | 1240 | 1550.2 | | |
| | | 0 | 18.7768 | 37.5536 | 56.33 | 75.11 | 93.884 | | |
| | | 0 | 18.7768 | 37.5536 | 56.33 | 75.11 | 93.884 | | |
| | | 0 | 18.7768 | 37.5536 | 56.33 | 75.11 | 94.376 | | |
| | | 0 | 21.0304 | 43.5364 | 69.57 | 104.7 | 151.88 | | |
| | | 0 | 47.604 | 70.0692 | 104.49 | 146 | 156.49 | | |
| | | 0 | 67.4327 | 91.8755 | 139.92 | 148.5 | 158.8 | | |
| | | 0 | 81.2197 | 110.37 | 141.4 | 149.9 | 160.11 | | |

TORQUE IN COUNTS

| SPEED IN COUNTS | 0 | 64 | 128 | 192 | 256 | 320 | | RPM |
|---|---|---|---|---|---|---|---|---|
| | cur1 | cur2 | cur3 | cur4 | cur5 | cur6 | | |
| 0 | 0 | 19 | 38 | 56 | 75 | 94 | | 0 |
| 512 | 0 | 19 | 38 | 56 | 75 | 94 | | 977.85 |
| 1024 | 0 | 19 | 38 | 56 | 75 | 94 | | 1955.7 |
| 1536 | 1 | 21 | 44 | 70 | 105 | 152 | | 2933.5 |
| 2048 | 35 | 48 | 70 | 104 | 146 | 156 | | 3911.4 |
| 2560 | 55 | 67 | 92 | 140 | 148 | 159 | | 4889.2 |
| 3072 | 68 | 81 | 110 | 141 | 150 | 160 | | 5867.1 |

Motor current (counts) 1 amp/count

In the manners described above, the motor current vector of a PM electric machine may be estimated. Thereby, eliminating computationally intensive calculations and providing a method for performing motor diagnostics not previously available without the utilizing expensive sensors and computations.

The disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating current in a PM electric machine, the method comprising:

acquiring a torque value representative of the torque produced by said electric machine;

receiving a position value indicative of the rotational position of said electric machine;

obtaining a speed value indicative of the rotational velocity of said electric machine;

receiving a temperature value representative of a temperature of said electric machine;

calculating an estimate of said current; and said calculating is based upon at least one of said torque value, said position value, said speed value, and said temperature value.

2. The method of claim 1 wherein said estimate is responsive to an uncompensated current.

3. The method of claim 2 wherein said uncompensated current is scaled by a motor back EMF constant ratio.

4. The method of claim 2 wherein said motor back EMF constant ratio is proportional to the operating temperature.

5. The method of claim 4 wherein said uncompensated current is the resultant of a multidimensional look-up table, said multidimensional look-up table indexed by a modified torque value and a modified motor speed value.

6. The method of claim 5 wherein said modified torque value is responsive to a desired torque value wherein said desired torque value is scaled by a motor constant squared correction factor.

7. The method of claim 6 wherein said motor constant squared correction factor equals $[K_{e(est)}/K_{e(act)}]^2$.

8. The method of claim 5 wherein said modified motor speed value is responsive to said motor speed value compensated for variations in motor resistance as a function of temperature.

9. The method of claim 8 wherein said modified motor speed value equals $\omega_m R_{(est)}/R_{(act)}$.

10. The method of claim 5 wherein said multidimensional look-up table comprises 42 elements.

11. The method of claim 1 wherein said estimate is responsive to a multidimensional look-up table, said multidimensional look-up table indexed by a modified torque value and a modified motor speed value.

12. The method of claim 11 wherein said multidimensional look-up table comprises 42 elements.

13. The method of claim 1 wherein said estimate is responsive to a modified torque value.

14. The method of claim 13 wherein said modified torque value is responsive to a desired torque value wherein said desired torque value is scaled by a motor constant squared correction factor.

15. The method of claim 14 wherein said motor constant squared correction factor equals $[K_{e(est)}/K_{e(act)}]^2$.

16. The method of claim 1 wherein said estimate is responsive to a modified speed value.

17. The method of claim 16 wherein said modified motor speed value is responsive to said motor speed value compensated for variations in motor resistance as a function of temperature.

18. The method of claim 17 wherein said modified motor speed value equals $\omega_m R_{(est)}/R_{(act)}$.

19. A system for estimating current in an electric machine, the system comprising:

a PM electric machine;

a position sensor configured to measure a rotor position of said electric machine and transmit a position signal;

a temperature sensor configured to measure a temperature of said electric machine transmit a temperature signal;

a controller, said controller receives said position signal and calculate a motor speed value; receives a temperature signal and generate a temperature value; calculates said estimate of said current.

20. The system of claim 19 wherein said estimate is based upon at least one of said torque value, said position value, said speed value, and said temperature value.

21. The system of claim 19 wherein said estimate is responsive to an uncompensated current.

22. The system of claim 21 wherein said uncompensated current is scaled by a motor back EMF constant ratio.

23. The system of claim 21 wherein said motor back EMF constant ratio is proportional to the operating temperature.

24. The system of claim 23 wherein said uncompensated current is the resultant of a multidimensional look-up table, said multidimensional look-up table indexed by a modified torque value and a modified motor speed value.

25. The system of claim 24 wherein said modified torque value is responsive to a desired torque value wherein said desired torque value is scaled by a motor constant squared correction factor.

26. The system of claim 25 wherein said motor constant squared correction factor equals $[K_{e(est)}/K_{e(act)}]^2$.

27. The system of claim 24 wherein said modified motor speed value is responsive to said motor speed value compensated for variations in motor resistance as a function of temperature.

28. The system of claim 27 wherein said modified motor speed value equals $\omega_m R_{(est)}/R_{(act)}$.

29. The system of claim 24 wherein said multidimensional look-up table comprises 42 elements.

30. The system of claim 19 wherein said estimate is responsive to a multidimensional look-up table, said multidimensional look-up table indexed by a modified torque value and a modified motor speed value.

31. The system of claim 30 wherein said multidimensional look-up table comprises 42 elements.

32. The system of claim 19 wherein said estimate is responsive to a modified torque value.

33. The system of claim 32 wherein said modified torque value is responsive to a desired torque value wherein said desired torque value is scaled by a motor constant squared correction factor.

34. The system of claim 33 wherein said motor constant squared correction factor equals $[K_{e(est)}/K_{e(act)}]^2$.

35. The system of claim 19 wherein said estimate is responsive to a modified speed value.

36. The system of claim 35 wherein said modified motor speed value is responsive to said motor speed value compensated for variations in motor resistance as a function of temperature.

37. The system of claim 36 wherein said modified motor speed value equals $\omega_m R_{(est)}/R_{(act)}$.

38. A storage medium encoded with a machine-readable computer program code for estimating a current in an electric machine, said storage medium including instructions for causing controller to implement a method comprising:

acquiring a torque value representative of the torque produced by said electric machine;

receiving a position value indicative of the rotational position of said electric machine;

obtaining a speed value indicative of the rotational velocity of said electric machine;

receiving a temperature value representative of a temperature of said electric machine;

calculating an estimate of said current; and said calculating based upon at least one of said torque value, said position value, said speed value, and said temperature value.

39. A computer data signal embodied in a carrier wave for estimating a current vector in an electric machine, said data signal comprising code configured to cause a controller to implement a method comprising:

acquiring a torque value representative of the torque produced by said electric machine;

receiving a position value indicative of the rotational position of said electric machine;

obtaining a speed value indicative of the rotational velocity of said electric machine;

receiving a temperature value representative of a temperature of said electric machine;

calculating an estimate of said current; and said calculating based upon at least one of said torque value, said position value, said speed value, and said temperature value.

* * * * *